(12) United States Patent
Bermes

(10) Patent No.: US 9,403,567 B2
(45) Date of Patent: Aug. 2, 2016

(54) TRAILER INCLUDING FRAME CONSTRUCTED WITH STRUCTURAL MEMBERS HAVING INTEGRALLY FORMED SECTIONS

(71) Applicant: Steven P. Bermes, Fort Wayne, IN (US)

(72) Inventor: Steven P. Bermes, Fort Wayne, IN (US)

(73) Assignee: Novae Corporation, Markle, IN (US)

( * ) Notice: Subject to any disclaimer, the term of this patent is extended or adjusted under 35 U.S.C. 154(b) by 404 days.

(21) Appl. No.: 13/924,102

(22) Filed: Jun. 21, 2013

(65) Prior Publication Data

US 2014/0375018 A1    Dec. 25, 2014

(51) Int. Cl.
*B62D 63/06* (2006.01)
*B62D 63/08* (2006.01)
*B62D 21/02* (2006.01)

(52) U.S. Cl.
CPC .............. *B62D 63/06* (2013.01); *B62D 63/062* (2013.01); *B62D 21/02* (2013.01); *B62D 63/08* (2013.01)

(58) Field of Classification Search
CPC ........ B62D 21/02; B62D 21/03; B62D 59/00; B62D 59/02; B62D 59/04; B62D 61/10; B62D 63/06; B62D 63/061; B62D 63/062; B62D 63/064; B62D 63/065; B62D 63/067; B62D 63/068; B62D 63/08
See application file for complete search history.

(56) References Cited

U.S. PATENT DOCUMENTS

| | | | | |
|---|---|---|---|---|
| 4,043,583 A * | 8/1977 | Tidwell, Jr. | .......... | B62D 63/062 296/183.1 |
| 4,421,365 A * | 12/1983 | Taniwaki | ............... | A47B 53/02 104/287 |
| 5,215,331 A * | 6/1993 | Pittman | ................ | B06G 11/225 280/788 |
| 5,634,663 A * | 6/1997 | Krupp | ................... | B62D 21/02 280/781 |
| 6,179,369 B1 * | 1/2001 | Bender | .................. | B62D 21/02 296/182.1 |
| 6,637,809 B1 * | 10/2003 | Friede | .................... | B62D 21/02 280/124.116 |
| 6,905,137 B2 * | 6/2005 | Fowler | ................. | B62D 29/041 280/781 |
| 7,665,768 B2 * | 2/2010 | Duval | ................. | B62D 63/061 280/656 |
| 7,690,721 B2 * | 4/2010 | Gruneklee | .......... | B62D 27/023 296/203.01 |
| 2003/0189359 A1 * | 10/2003 | Few | ....................... | B62D 63/08 296/204 |
| 2007/0031226 A1 * | 2/2007 | Hynes | ...................... | B60P 1/00 414/482 |
| 2007/0045981 A1 * | 3/2007 | Galazin | ............... | B62D 53/068 280/149.2 |
| 2007/0069496 A1 * | 3/2007 | Rinehart | ............... | B21D 53/88 280/124.166 |
| 2007/0216147 A1 * | 9/2007 | Ramsey | .................. | B60G 7/02 280/781 |
| 2012/0319390 A1 * | 12/2012 | Burger | ................... | B62D 21/02 280/785 |
| 2012/0328898 A1 * | 12/2012 | Strickland | ............. | B62D 21/02 428/594 |
| 2013/0300097 A1 * | 11/2013 | Garceau | ................. | B62D 21/02 280/789 |

* cited by examiner

*Primary Examiner* — Joseph Rocca
*Assistant Examiner* — Marc A Scharich
(74) *Attorney, Agent, or Firm* — George Pappas

(57) ABSTRACT

A trailer including a frame supporting a trailer bed and having rotatable wheels and a tongue for pivotal attachment to a land vehicle hitch. The trailer frame includes left and right side structural members and crossbeam members attached between the side members. Each side member includes a U-shaped portion having a branch leg and attachment leg and an L-shaped portion including a branch leg and attachment leg. The branch leg of the U-shaped portion is integrally formed with the branch leg of the L-shaped portion. The crossbeam members are Z-shaped and the flanges thereof are attached to the attachment legs of the U-shaped portion and the L-shaped portion with rivets. Front and rear U-shaped end members are attached to the terminal ends of the side members. A torque tube is also attached between the side members. A tongue pocket is attached to the torque tube and the front end member.

20 Claims, 18 Drawing Sheets

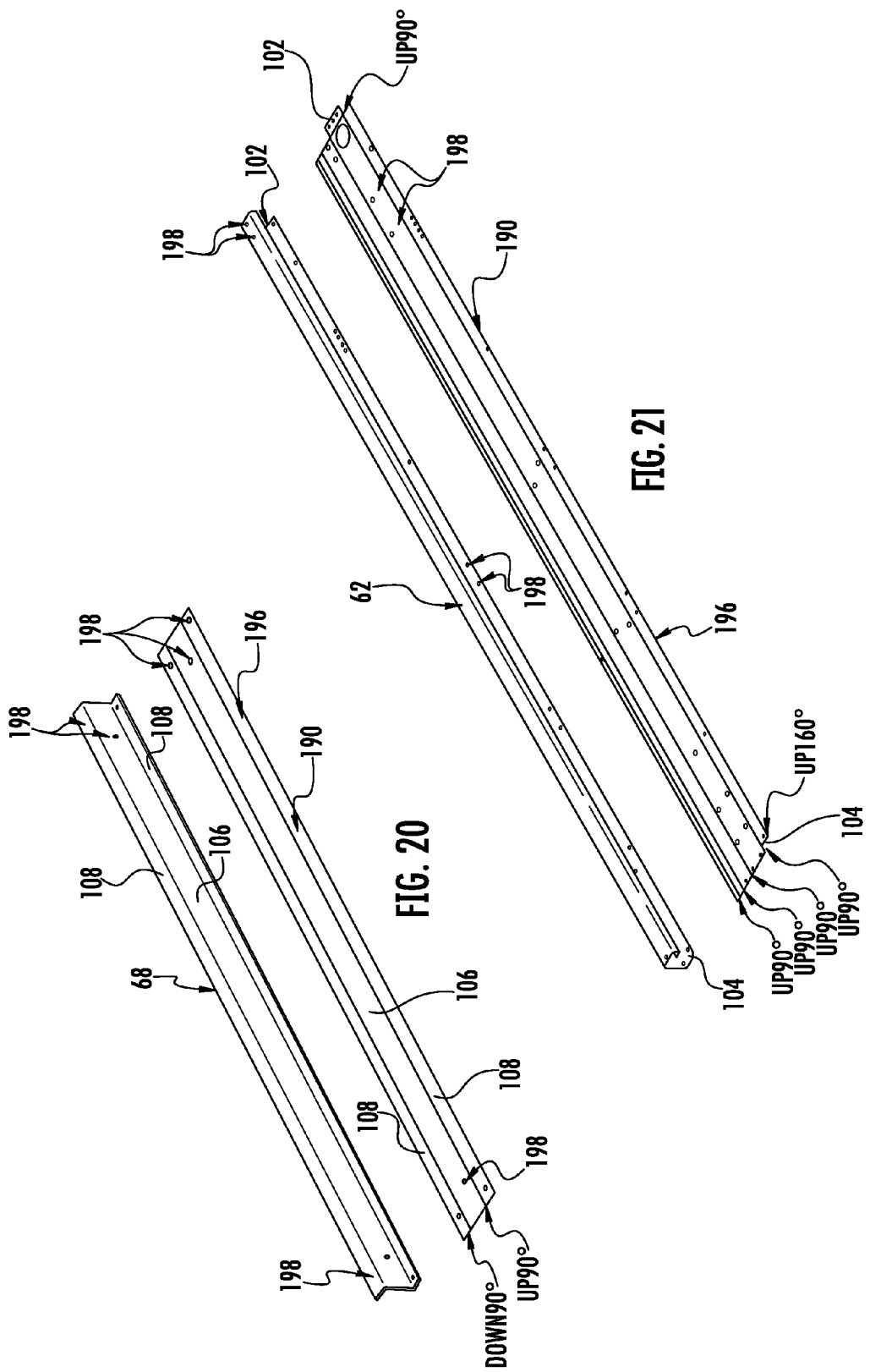

TRAILER INCLUDING FRAME CONSTRUCTED WITH STRUCTURAL MEMBERS HAVING INTEGRALLY FORMED SECTIONS

BACKGROUND OF THE INVENTION

1. Field of the Invention

The present invention relates to the field of manufacturing trailers which are adapted to be pivotally attached to and pulled behind land vehicles. More particularly, the present invention relates to trailers having a frame constructed of a plurality of structural members made of integrally formed sections and attached to one another with fasteners.

2. Background

Trailers are today commonly used by pivotally attaching to and being pulled behind land vehicles for hauling all sorts of cargo. Typically, such trailers, including trailers with capacities of less than 7000 pounds, are manufactured by cutting steel stock (angles, channels and flats having thicknesses of 0.125 to 0.375 inch) and welding such steel stock and thereby creating the trailer frame, tongue, side panels, etc. After welding, the frames and other components thereof are typically painted for inhibiting rust. As can be appreciated, this manufacturing process is laborious and the materials costs are significant thereby making the overall cost of the trailers relatively expensive.

Accordingly a need exists for trailers and a method of manufacturing trailers, especially those trailers with capacities of less than 7000 pounds, which are relatively less expensive and which are nevertheless sturdy, reliable and relatively long-lasting.

SUMMARY OF THE INVENTION

In one form thereof the present invention is directed to a trailer having a frame constructed of a plurality of structural members supporting a trailer bed, wheels rotatably secured to the frame and a tongue adapted to be pivotally attached to a land vehicle hitch, said trailer frame comprising:

left and right side structural members and a plurality of crossbeam members attached to and extending between said side members;

wherein said side members viewed in cross section include a U-shaped portion having a branch leg and an attachment leg integrally formed with and extending from a base section, and an L-shaped portion including a branch leg integrally formed with an attachment leg, and wherein said branch leg of said U-shaped portion is integrally formed with said branch leg of the L-shaped portion; and, wherein said crossbeam members are attached at their terminal ends to said U-shaped portion attachment leg and to said L-shaped portion attachment leg.

Preferably, a trailer bed is secured to and is supported by said crossbeam members. Also, preferably, said crossbeams extend transverse to said side members and said trailer bed comprises a plurality of ⅝ inch wood members extending transverse to said crossbeams. More preferably, said crossbeams are attached to said side members with rivets.

Preferably, said crossbeam members are generally Z-shaped in cross-section and comprise a central web section and flange sections which are integrally formed therewith and extend generally perpendicular from the central web section and wherein, at each crossbeam terminal end securement to a side member, one of said flanges is secured to said U-shaped portion attachment leg and the other of said flanges is secured to said L-shaped portion attachment leg.

Preferably, the trailer further comprises front and rear end members, wherein said end members viewed in cross-section include a U-shaped portion having a lower leg and an upper leg integrally formed with and extending from a base section, and wherein terminal ends of said end members are secured to terminal ends of said left and right side members.

Further preferably, the trailer comprises a torque tube extending between and secured at its terminal ends to said U-shaped portion attachment leg and to said L-shaped portion attachment leg. The torque tube, in cross-section, preferably comprises a first U-shaped portion nested with and secured by welding to a second U-shaped portion. Preferably, a tongue pocket is provided and is secured to and extends transverse to said torque tube and said front end member, said tongue pocket adapted to securely receive said tongue for pivotal attachment to a land vehicle hitch.

Preferably the trailer bed is secured to and is supported by said crossbeam members and extends under the upper legs of said front and rear end members. Yet more preferably, a plurality of fasteners are provided extending through said upper leg of said rear end member, said trailer bed and a crossbeam member.

BRIEF DESCRIPTION OF THE DRAWINGS

The above mentioned and other features of this invention, and the manner of attaining them, will become more apparent and the invention itself will be better understood by reference to the following description of the embodiments of the invention taken in conjunction with the accompanying drawings, wherein:

FIG. 20 is a perspective view of an exemplary trailer frame crossbeam component depicted both before and after bending into a desired shape; and, FIG. 21 is a perspective view of an exemplary trailer frame side beam component depicted both before and after bending into a desired shape.

Figure 1:
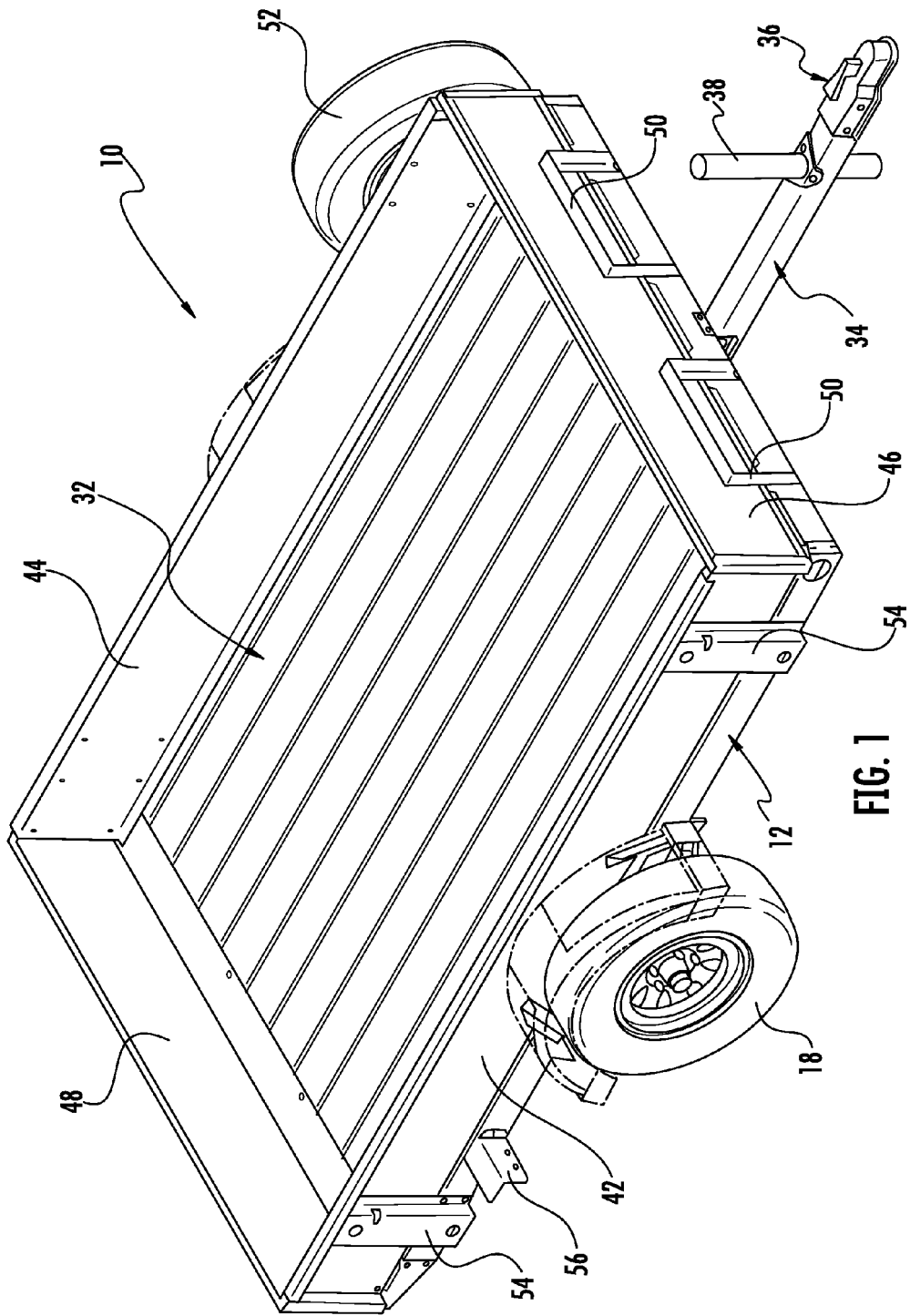
FIG. 1 is a perspective view of a trailer constructed of sheet metal in accordance with the principles of the present invention.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Figure 2:
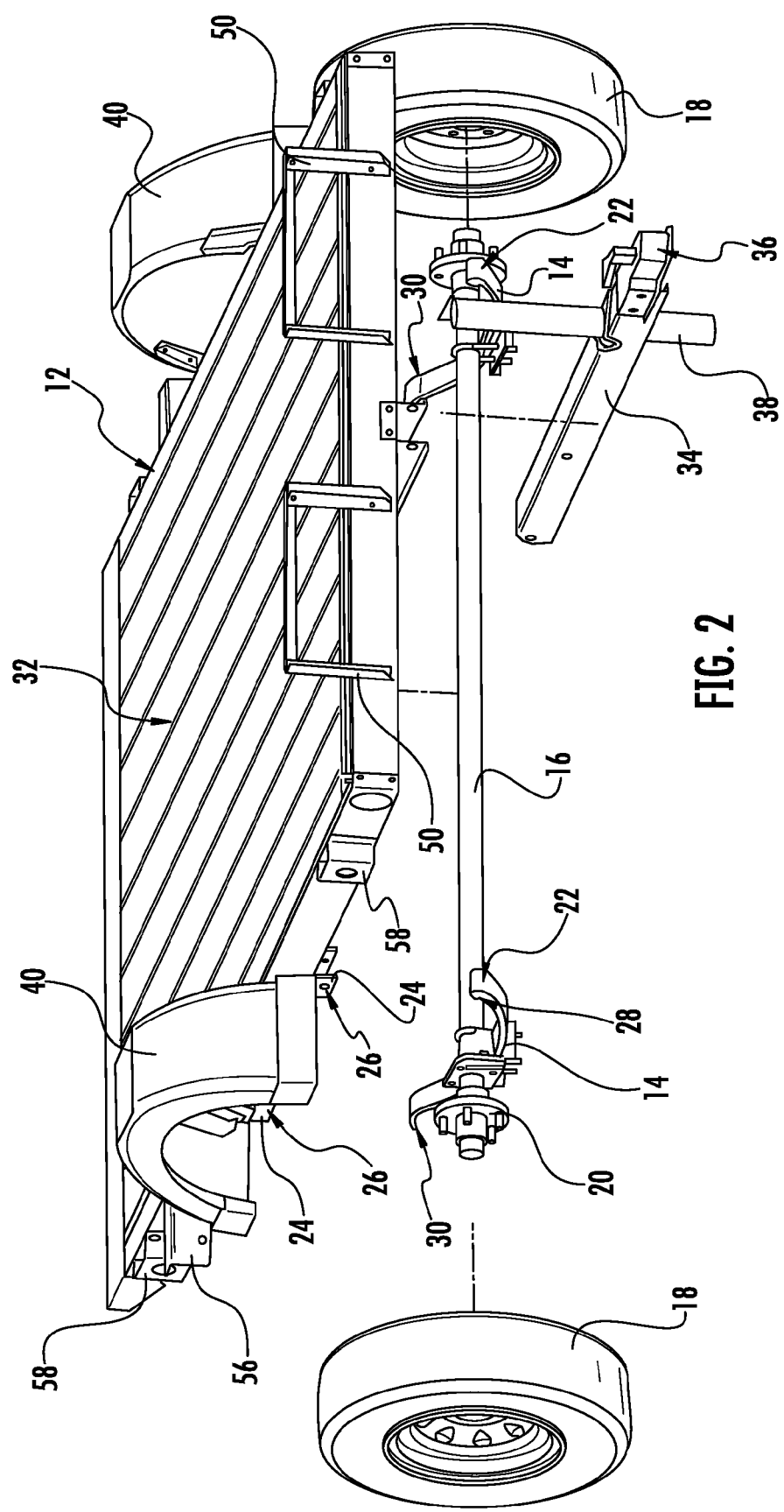
FIG. 2 is an exploded view of the frame, axle, wheels and tongue of the trailer shown in FIG. 1.
Figure 3:
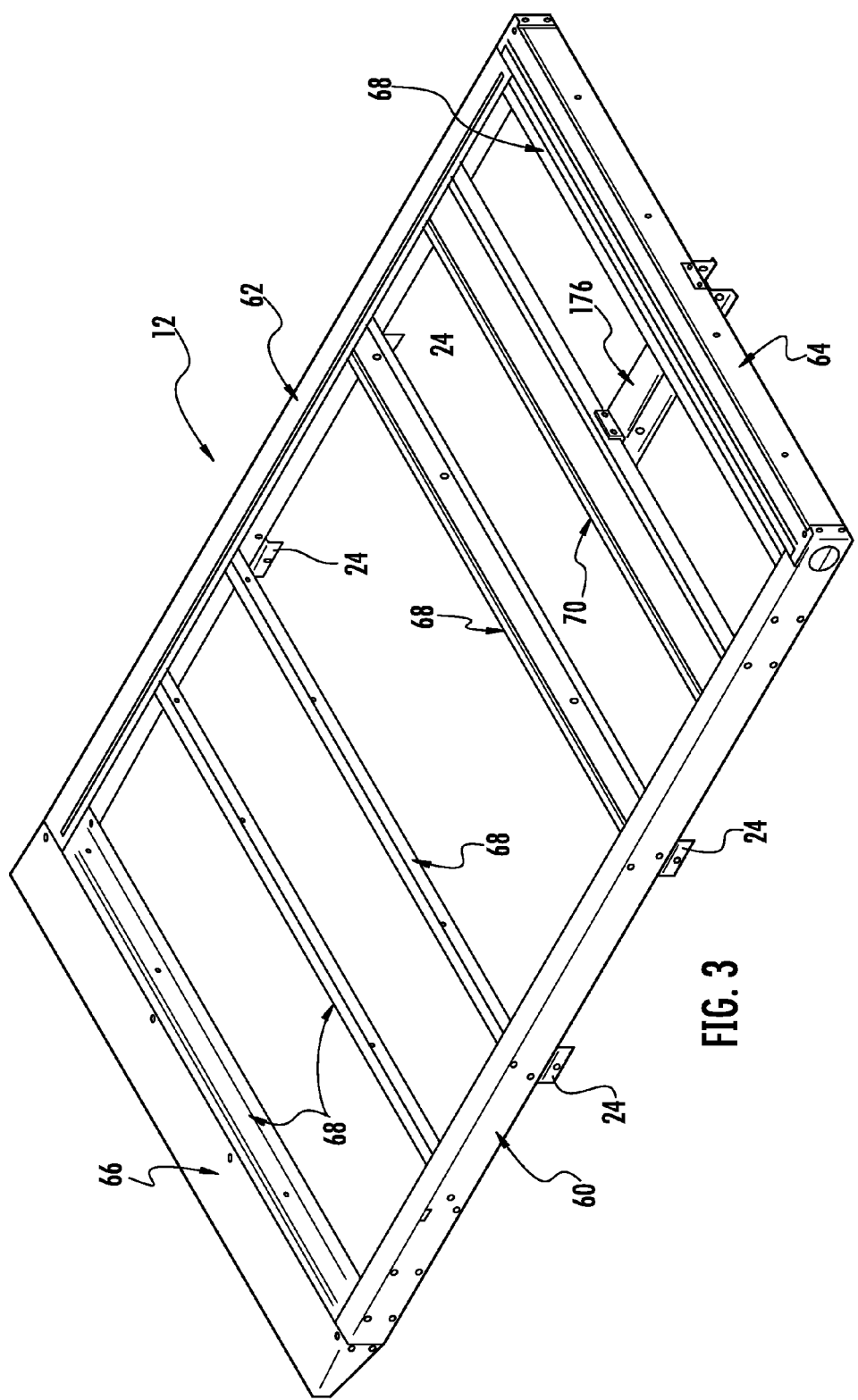
FIG. 3 is a top perspective view of the trailer frame shown in FIG. 2.
Figure 4:
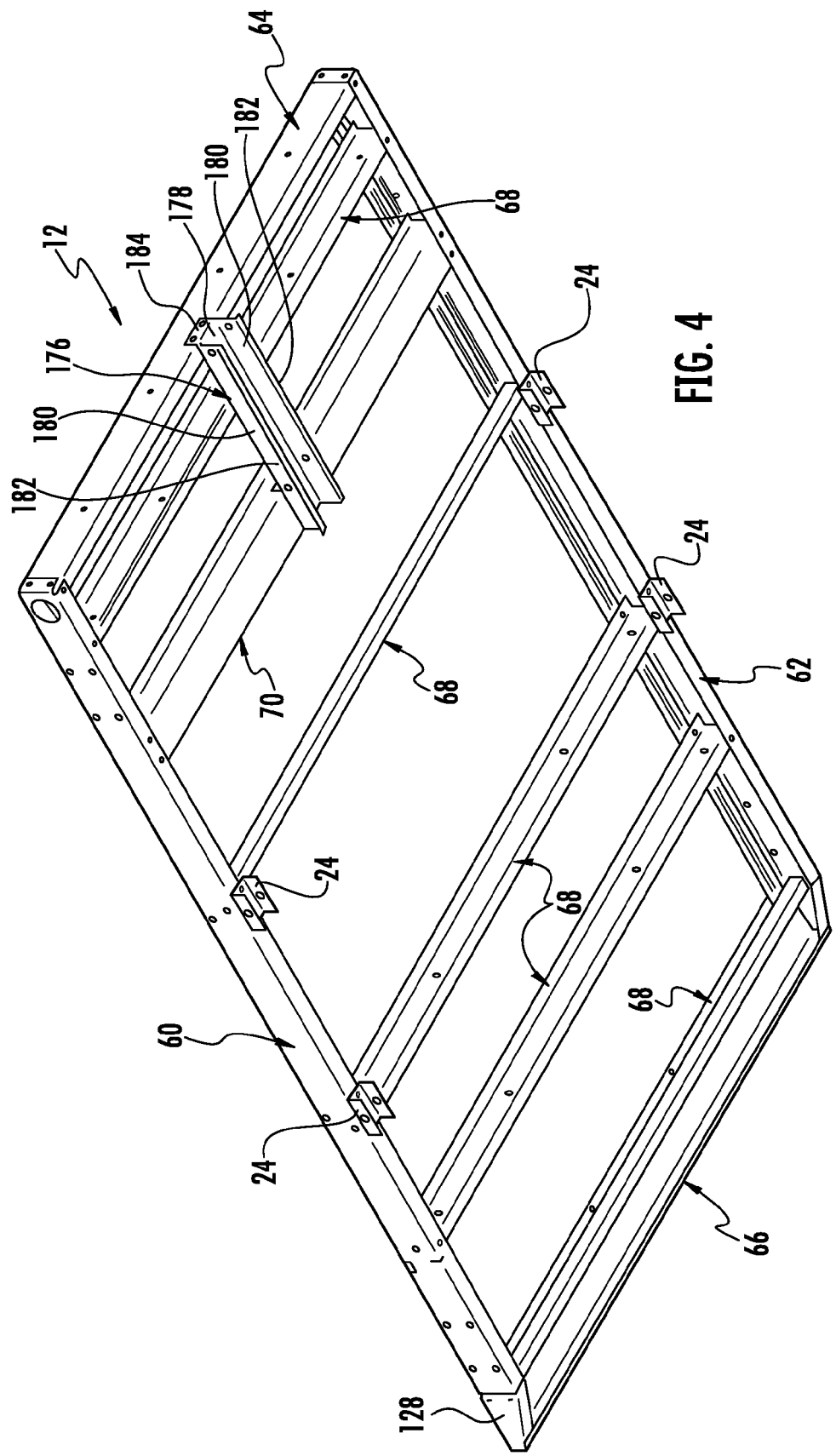
FIG. 4 is a bottom perspective view of the trailer frame shown in FIG. 2.
Figure 5:
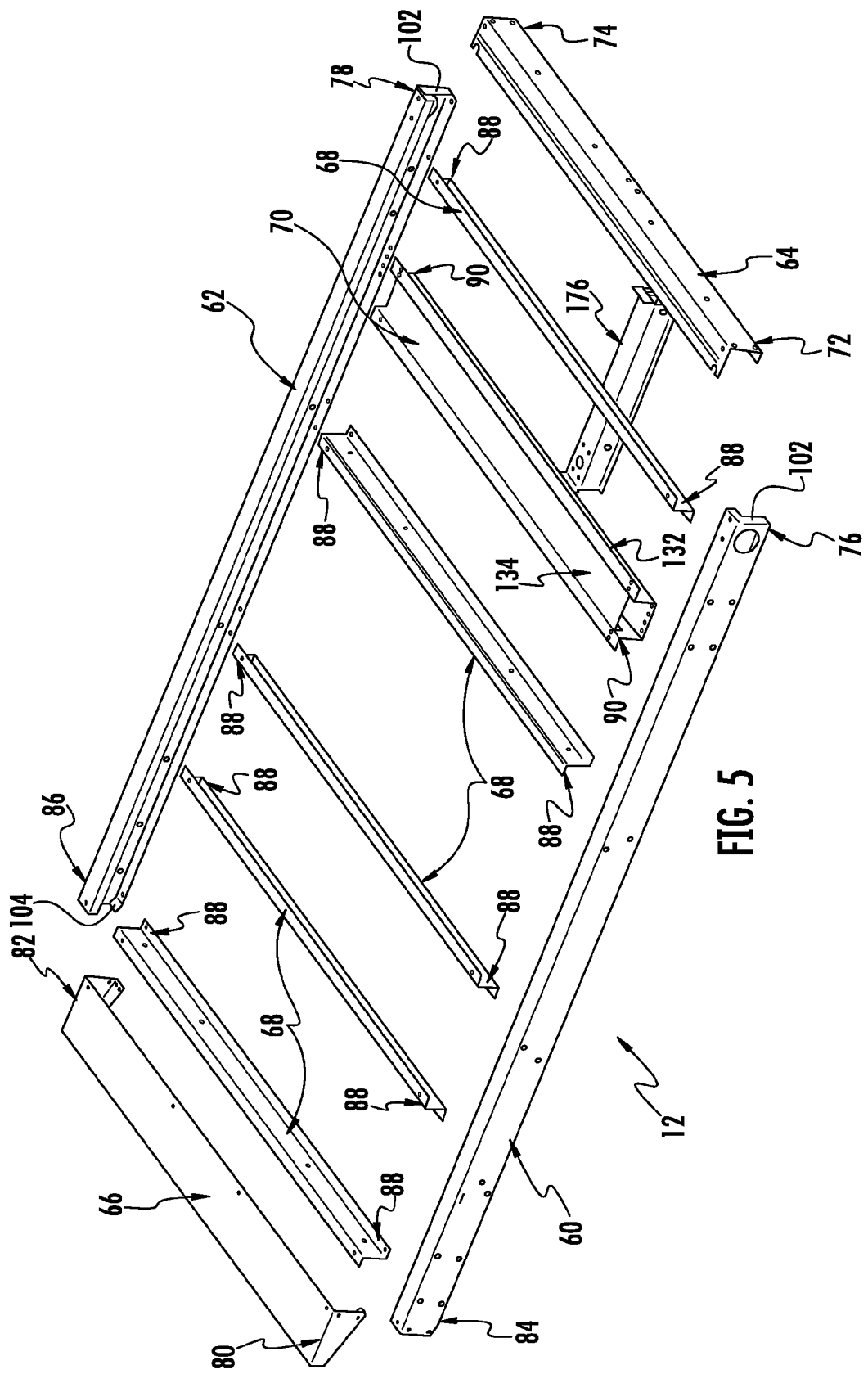
FIG. 5 is an exploded view of the trailer frame shown in FIG. 2 depicting the several components thereof.
Figure 6:
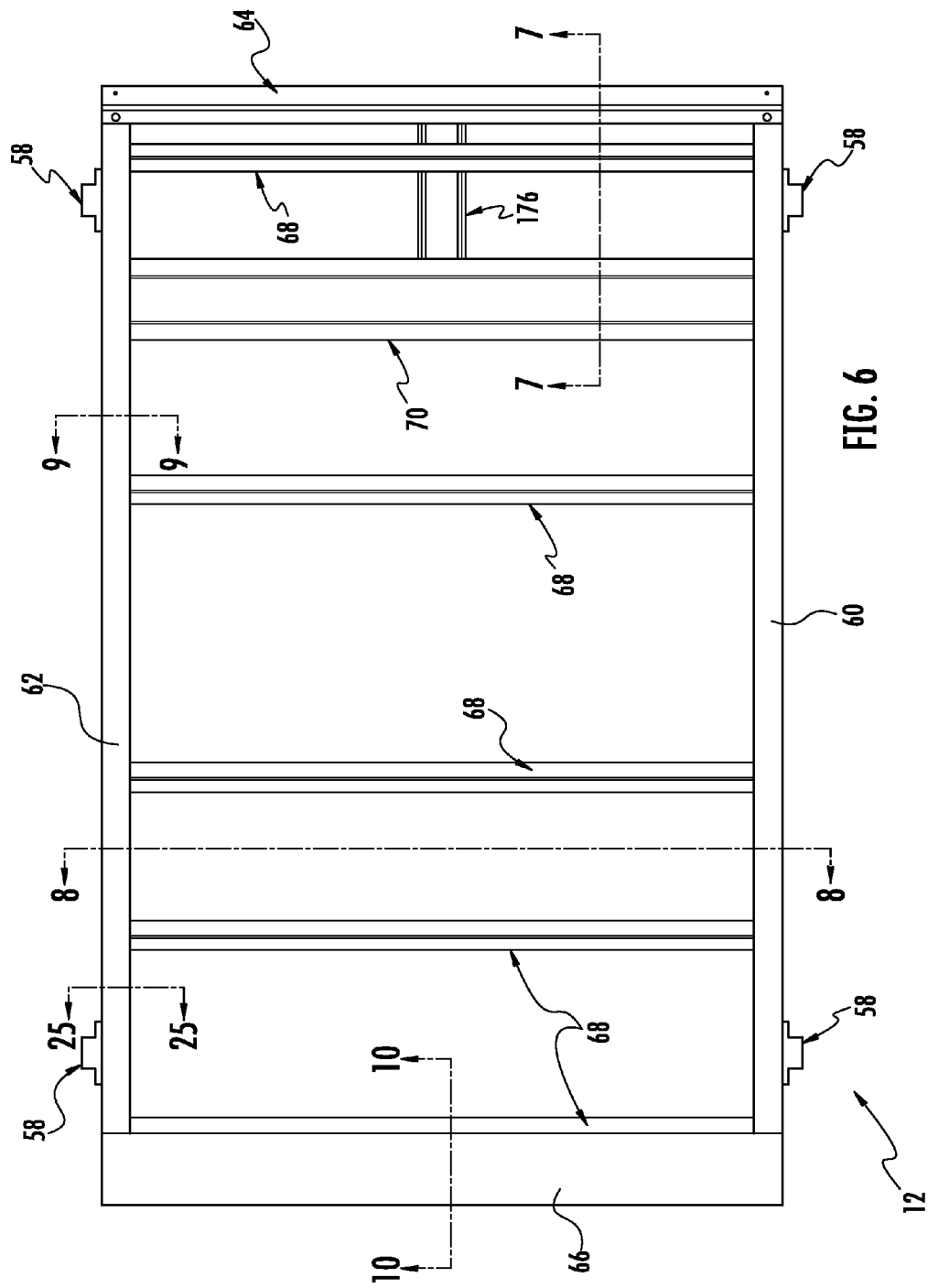
FIG. 6 is a top plan view of the trailer frame shown in FIG. 2.

Referring initially to FIGS. 1 and 2, a trailer constructed of structural components/members made of sheet metal in accordance with the principles of the present invention is shown and generally designated by the numeral 10. Trailer 10 includes a frame 12 which is supported by leaf suspension springs 14, axle 16 and wheels 18 rotatably secured to spindles 20 thereof in a known and customary manner. The forward end 22 of the leaf springs 14 are pivotally secured to U-shaped brackets 24 which are attached to the underside of the frame 12 by extending a bolt (not shown) through the holes 26 in the U-shaped brackets 24 and the hole 28 at the forward end 22 of the leaf springs 14. The rear end 30 of leaf springs 14 are secured to the underside of the frame 12 using similar U-shaped brackets 24 and bolts (not shown) extending through holes 26 thereof. However, the leaf springs rear end 30 is maintained within the U-shaped bracket with bolts (not shown) for thereby allowing the springs rear end 30 to longitudinally slide within the bracket as the leaf springs flex, for thereby transferring the weight from the trailer to the axle 16.

Frame 12 is adapted to support a trailer bed 32 preferably made of treated wood such as 5/4 inch decking or other standard timber materials. A tongue 34 is secured to the frame 12 and extends forwardly of the trailer 10. Tongue 34 includes a ball hitch coupling assembly 36 at its forward terminal end for detachably securing to a vehicle ball hitch (not shown) in a known and customary manner. An A-frame jack tube 38 is secured to the tongue 34 and is adapted to receive a standard gearbox and extension tube (not shown) for supporting and selectively raising and lowering the tongue 34 and, hence, the forward end of the trailer 10.

Trailer 10 can further include wheel fenders 40 secured to the frame 12 and positioned over the wheels 18. Lights brackets 56 are also secured to and extend outwardly from the frame 12 whereupon trailer lights (not shown) can be mounted.

Left and right sidewalls 42, 44, front wall 46 and rear tailgate 48 can also be provided and secured to the frame 12. The left and right sidewalls 42, 44 can be secured with sidewall supporting frame members 54 which are secured to and extend upwardly from the frame 12. A spare wheel 52 can be detachably secured to one of the sidewall supporting frame members 54.

As seen in FIG. 2 wherein the sidewalls, front wall and tailgate 42, 44, 46 and 48 have been omitted, wheels stops 50 can be provided at the forward end of the frame 12 for abutting the wheels of vehicles such as ATVs and lawn tractors being carried on the trailer 10 without a front wall 46. Combination stake pockets and strap securement members 58 can also be provided and secured to the frame 12. Securement members 58 are adapted to slidingly receive and support a 2×4 wood member in a position similar to sidewall supporting frame members 54 and securing other sidewalls thereto as may be desired. Advantageously, securement members 58 are also adapted for selectively attaching thereto double J-hooks of common ratchet straps.

Trailer frame 12 is made by assembling and securing together with rivets or other suitable fasteners: left and right side structural members 60, 62; front end structural member 64; rear end structural member 66; crossbeam members 68, and, torque tube 70. The left and right terminal ends 72, 74 of the front end structural member 64 are secured to the respective front terminal ends 76, 78 of the left and right side structural members 60, 62. The left and right terminal ends 80, 82 of the rear end structural member 66 are secured to the respective rear terminal ends 84, 86 of the left and right side structural members 60, 62. The crossbeam members 68 are secured, at their terminal ends 88, to and between the left and right side structural members 60, 62. The torque tube 70 is also similarly secured, at its terminal ends 90, to and between the left and right side structural members 60, 62. The front end structural number 64, rear end structural number 66, cross beam members 68 and the torque tube 70 are, hence, secured between and extend transverse to the left and right side structural members 60, 62.

Figure 9:
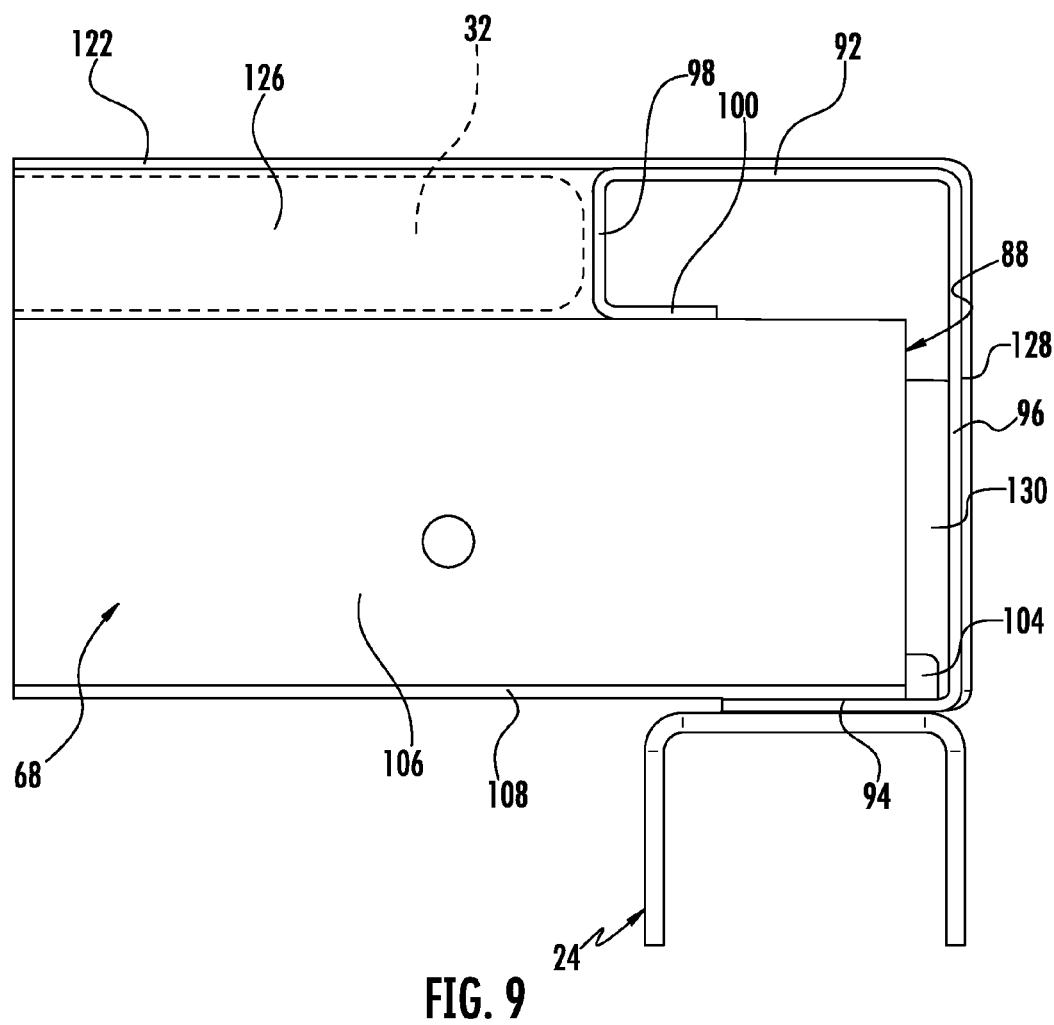
FIG. 9 is a cross-sectional view taken along line 9-9 of FIG. 6.

As best seen in FIG. 9, the left and right side structural members 60, 62, when viewed in cross-section, comprise: a U-shaped portion including a branch leg 92 and an attachment leg 94 integrally formed with and extending from a base section 96; and, an L-shaped portion including a branch leg 98 integrally formed with an attachment leg 100. The branch leg 92 of the U-shaped portion is integrally formed with the branch leg 98 of the L-shaped portion. At their front terminal ends 76, 78, the side structural members 60, 62 each include a tab 102 integrally formed with and extending generally perpendicular from their base section 96. At their rear terminal ends 84, 86, the side structural members 60, 62 each include an upwardly bent element 104 formed by cutting a V-notch 104 between the base section 96 and attachment leg 94 and bending the attachment leg 94 portion adjacent the V-notch at an angle from the attachment leg 94.

The crossbeam members 68 are generally Z-shaped in cross-section and comprise a central web section 106 and flange sections 108 which are integrally formed therewith and extend generally perpendicular from the central web section 106.

Figure 7:
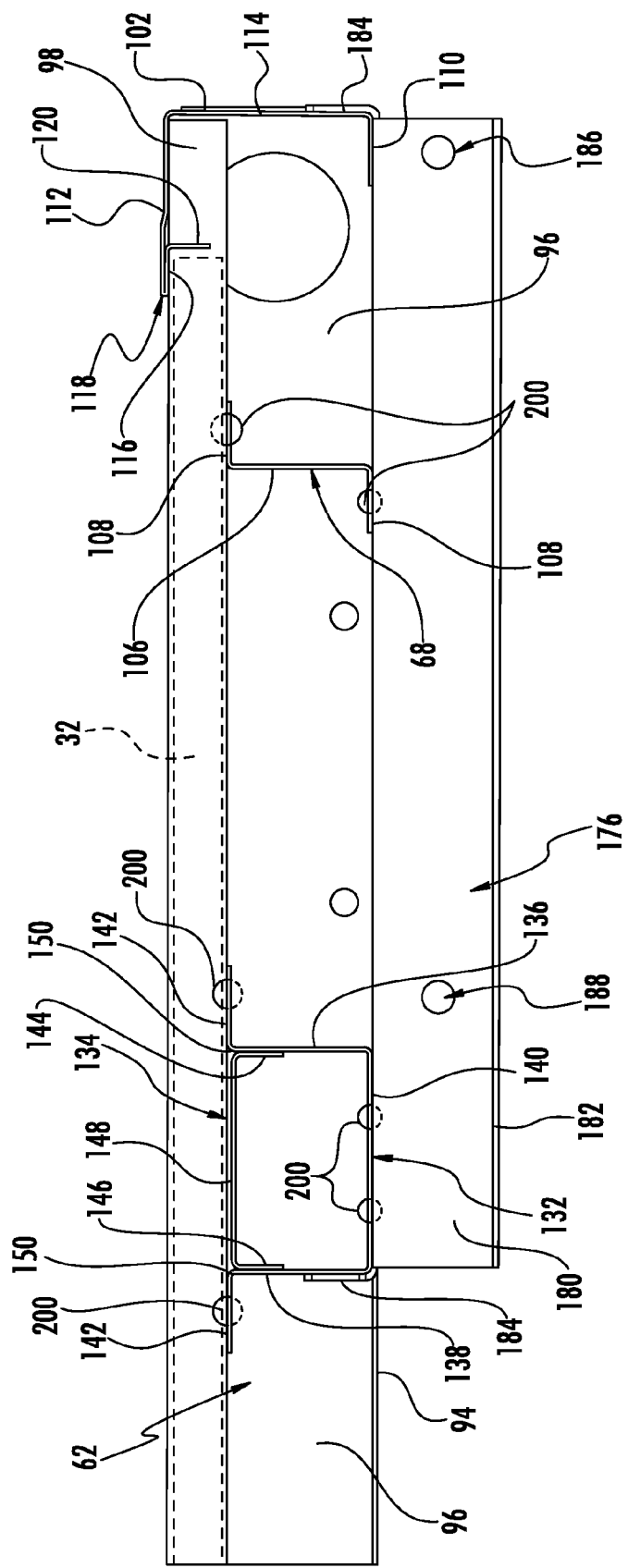
FIG. 7 is a cross-sectional view taken along line 7-7 of FIG. 6.
Figure 8:
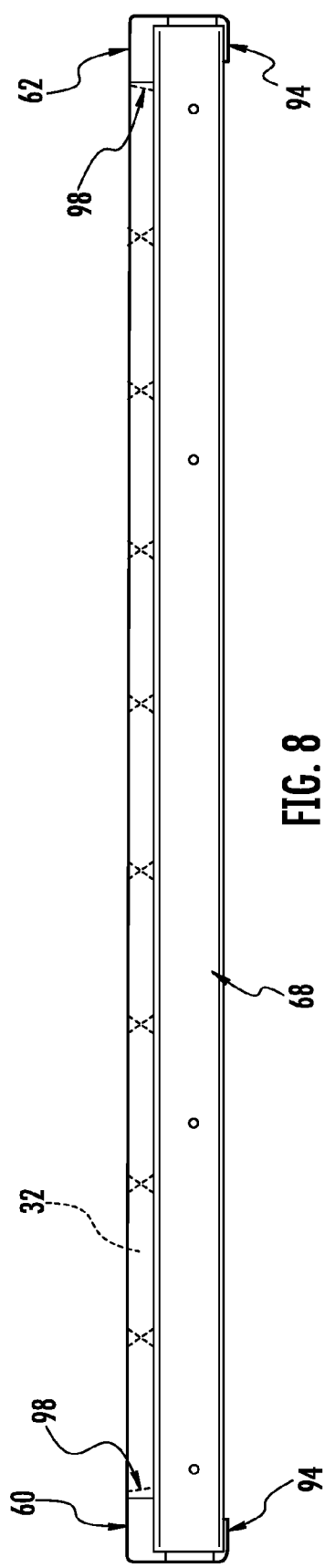
FIG. 8 is a cross-sectional view taken along line 8-8 of FIG. 6.
Figure 11:
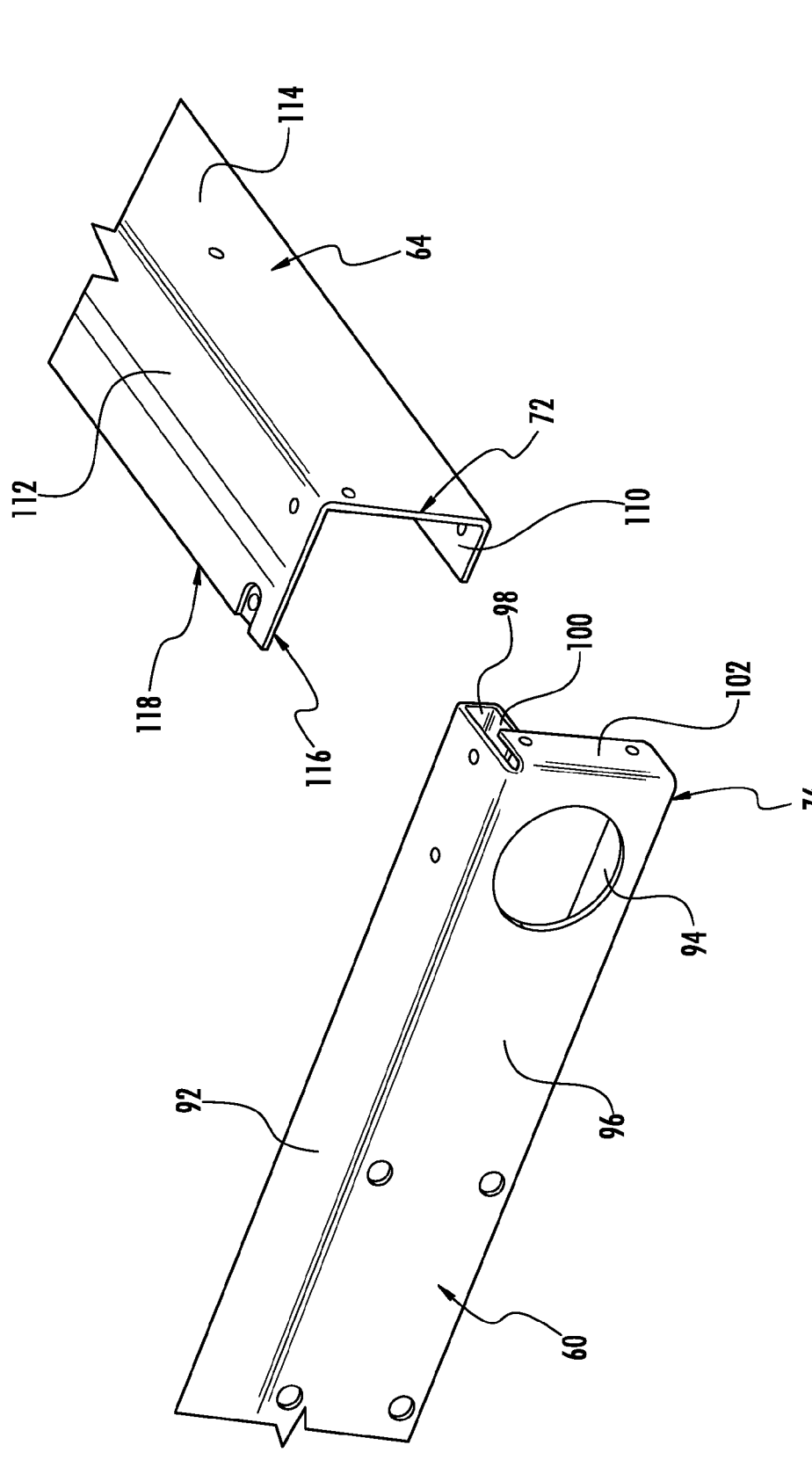
FIG. 11 is a partial perspective view of the side beam and front beam components of the trailer frame shown in FIG. 2 prior to assembly.

The front end structural member 64, in cross-section, is generally U-shaped having a lower leg 110 and an upper leg 112 integrally formed with and extending from a base section 114. The terminal portion of the upper leg 112 is bent over onto itself thereby forming an overlapping arrangement including an interior section 116 integrally formed with the upper leg 112 along a terminal edge 118. Upper leg 112 and interior section 116 are adjacent and parallel to one another. As best seen in FIG. 7, an abutment section 120 is integrally formed with the interior section 116 and extends generally perpendicular therefrom. The abutment section 120, as shown in FIG. 11, does not extend to the left and right terminal ends 72, 74 for thereby placing the terminal ends of the branch legs 92 parallel and adjacent the terminal ends of the upper leg 112 and securing to one another as further described hereinbelow.

Figure 10:
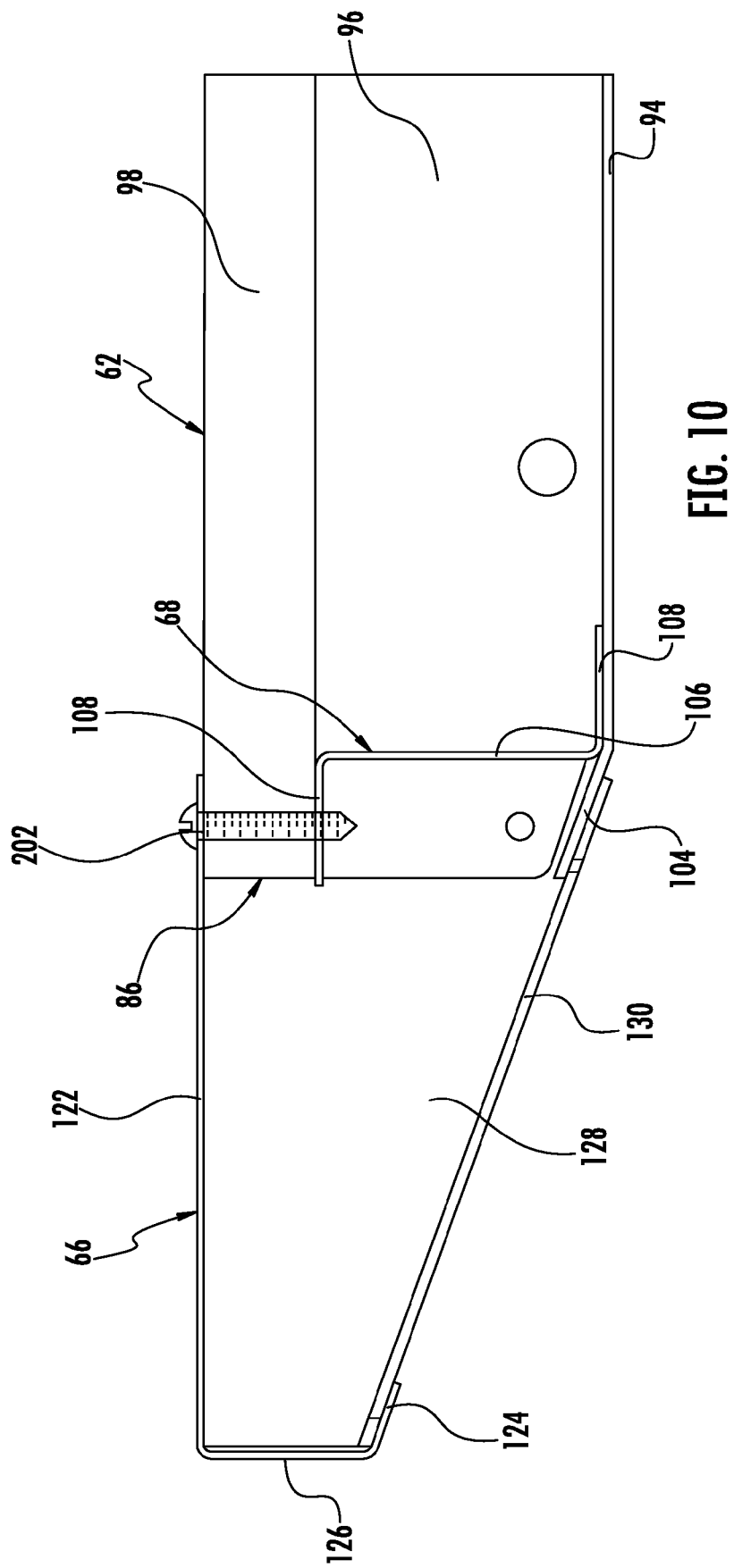
FIG. 10 is a cross-sectional view taken along line 10-10 of FIG. 6.

The rear end structural member 66, in cross-section, is also generally U-shaped and includes an upper panel 122 and toe panel 124 integrally formed with and extending from a rear panel 126. Upper panel 122 is generally perpendicular to the rear panel 126, whereas the toe panel 124 extends at an angle therefrom as best seen in FIG. 10. At each of the left and right terminal ends 80, 82, a side panel 128 is integrally formed with and extends generally perpendicular from the upper panel 122. A bottom side panel section 130 is integrally formed with and extends generally perpendicular from each of the side panels 128. Bottom side panel sections 130, as best seen in FIG. 10, extend at an angle relative to the upper panel 122 and are generally parallel with toe panel 124 and the upwardly bent elements 104 of the left and right side members 60, 62.

The torque tube 70, in cross-section, generally comprises a first U-shaped portion 132 nested and secured by welding with a second U-shaped portion 134. The first U-shaped portion 132 includes first and second legs 136, 138 extending from and integrally formed with a base section 140. Brim extensions 142 are integrally formed with and project generally perpendicular from the terminal ends of each of the first and second legs 136, 138. The second U-shaped portion 134 includes first and second legs 144, 146 extending from and integrally formed with a base section 148. As best seen in FIG. 7, the first U-shaped portion 134 is received within and nested in the second U-shaped portion 132 placing the first leg 136 of the first U-shaped portion 132 adjacent the first leg 144 of the second U-shaped portion 134 and placing the second leg 138 of the first U-shaped portion 132 adjacent the second leg 146 of the second U-shaped portion 148. U-shaped portions 132, 134 are secured to one another by welding as indicated by welding beads 150 located at the bends between the first and second legs 136, 138 and the brim extensions 142 and the bends between the first and second legs 144, 146 and the base section 148.

Referring now more particularly to FIGS. 13-17, in cross-section, the tongue 34 is tubular shaped and is made up of a rectangular component 152 having a longitudinal opening 154 and a flat sheet component 156 which fills the longitudinal opening 154 and is welded to the rectangular component 152. The rectangular component essentially comprises a U-shaped portion including sidewalls 158 integrally formed with and extending from a top wall 160. Flange sections 162 are integrally formed with and extend from the ends of the sidewalls 158 toward one another. Flange sections 162 are coplanar and the longitudinal opening 154 is located therebetween. The sheet component 156 is secured to the flange sections 162 by welding as indicated by welding beads 164 located at the terminal edges of the flange sections 162.

Figure 16:
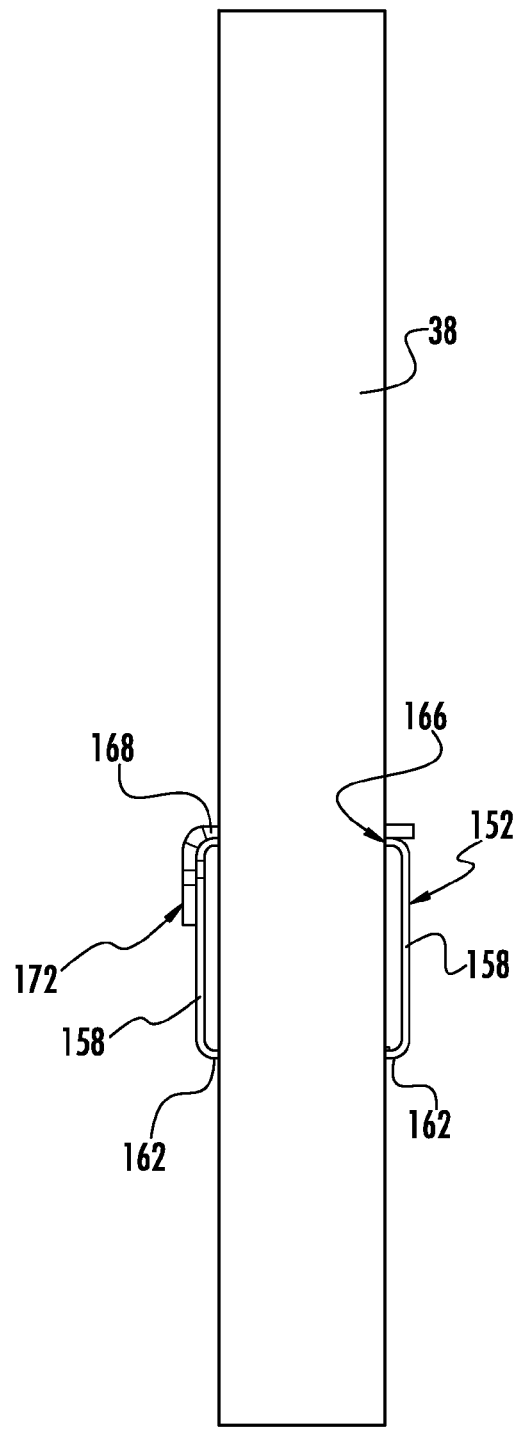
FIG. 16 is a cross-sectional view taken along line 16-16 of FIG. 15.
Figure 17:
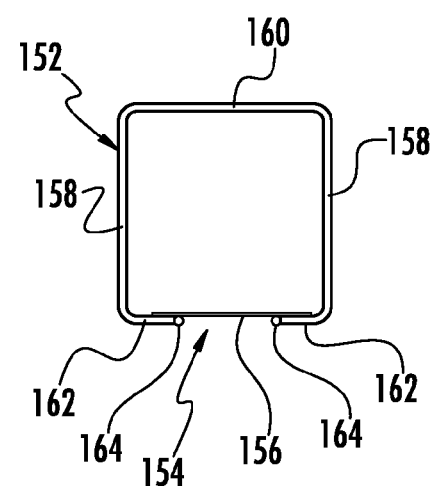
FIG. 17 is a cross-sectional view taken along line 17-17 of FIG. 15.

A hole 166 is provided in the top wall 160 of the rectangular component 152 and the jack tube 38 extends therethrough and also through the longitudinal opening 154 as best seen in FIG. 16. Jack tube 38 includes a triangular mounting plate 168 with bolt holes 170 extending therethrough adjacent each of the triangle corners. One corner 172 of the triangular plate 168 is bent and extends perpendicular therefrom for thereby placing the bent corner 172 and the bolt hole 170 thereof adjacent one of the sidewalls 158 of the rectangular component 152. The other corners of the triangular mounting plate 168 and bolt holes 170 thereat are thereby located adjacent the top wall 160 of the rectangular component 152. The jack tube 38 is thereby secured to the tongue 34 with two bolts (not shown) each of which extend through a bolt hole 170 and through the top wall 160 of the rectangular component 152, and one bolt (not shown) which extends through the bolt hole 170 of the bent corner 172 and through the sidewall 158 of the rectangular component 152. It is noted that the ball hitch coupling assembly 36 is also secured to the tongue 34 with bolts (not shown) which extend through holes 174 therethrough and aligned holes (not shown) which extend through the sidewalls 158 of the rectangular component 152.

The tongue 34 is pivotally secured to a trailer tongue pocket 176 which is, in turn, secured to the trailer frame 12. Pocket 176, in cross-section, is generally top hat shaped and comprises a top wall 178, sidewalls 180 integrally formed with and extending therefrom and brim portions 182 integrally formed with and extending perpendicular from the ends of the sidewalls 180. At each of its terminal ends, pocket 176 is provided with tabs 184 which are integrally formed with and extend perpendicularly upwardly from the top wall 178. Pocket 176 is provided with front holes 186 and rear holes 188 which extend through the sidewalls 180.

Figure 13:
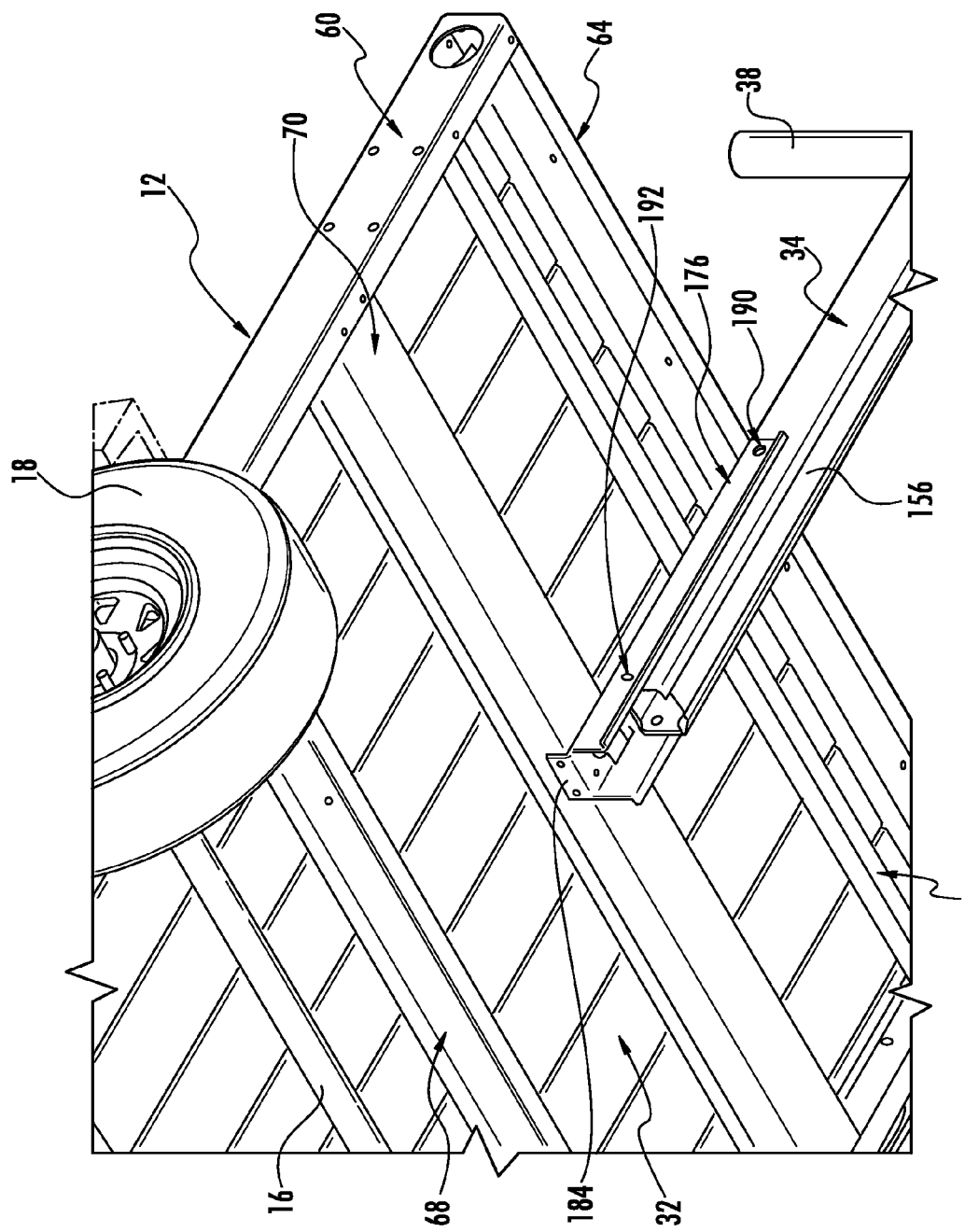
FIG. 13 is a partial perspective view of the trailer frame shown in FIG. 2 and showing the attachment of the trailer tongue thereto.
Figure 14:
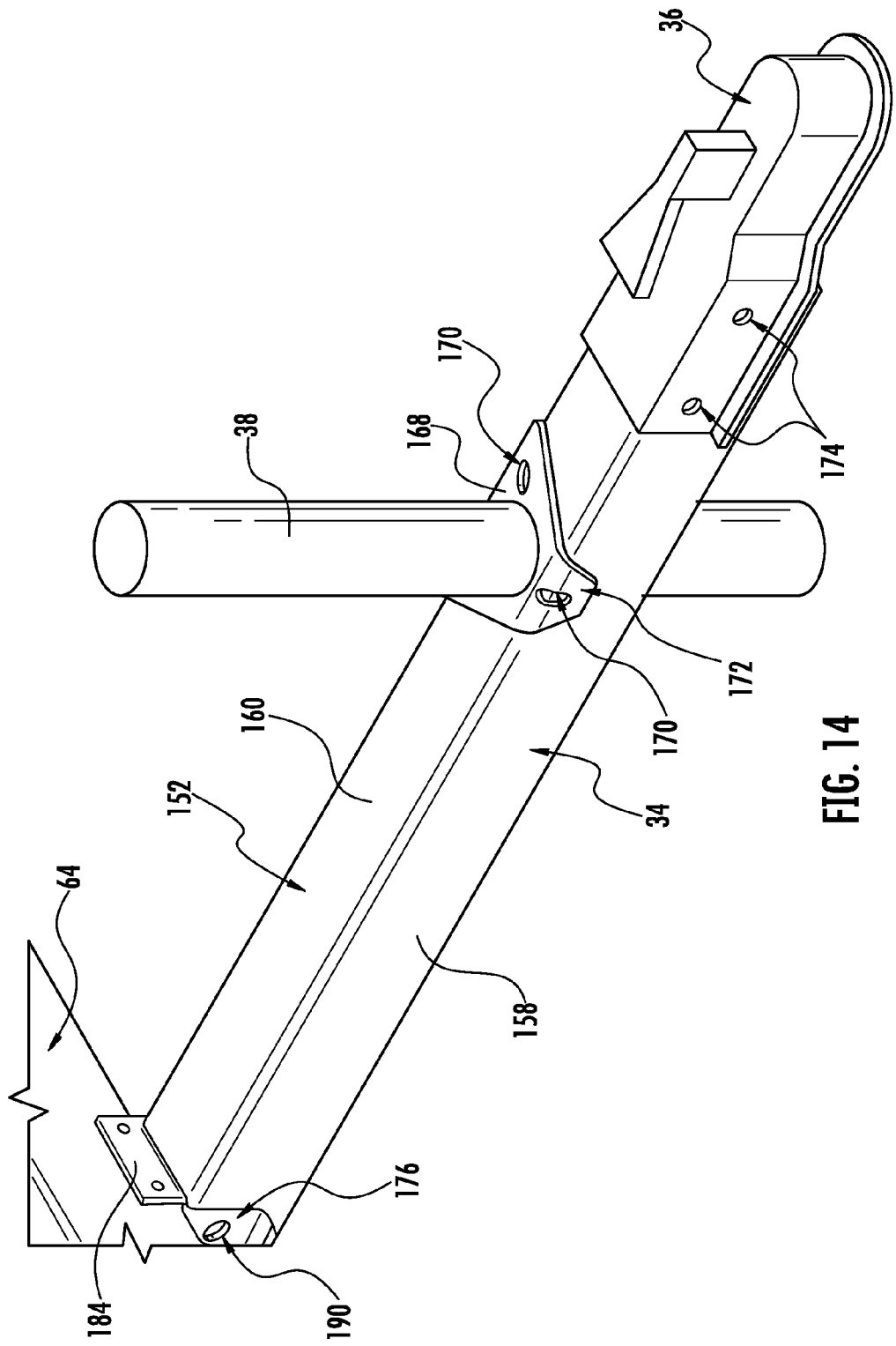
FIG. 14 is an enlarged perspective view of the trailer tongue and A-frame jack tube shown in FIG. 1.
Figure 15:
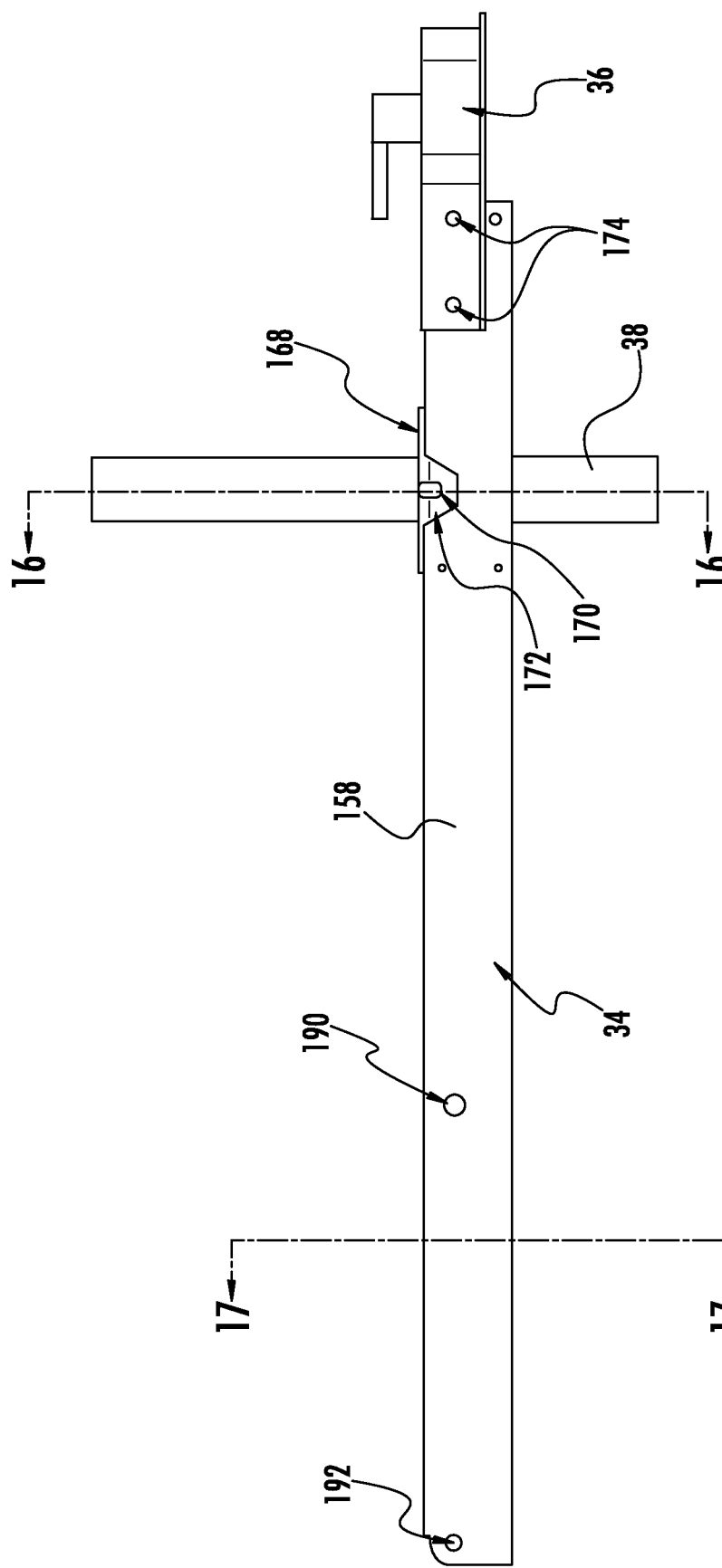
FIG. 15 is a side elevation view of the trailer tongue and A-frame jack shown in FIG. 14.

The rear portion of the tongue 34 is received within the tongue pocket 176 in a nested towing position as best seen in FIG. 13. In the nested towing position, holes 190 extending through the sidewalls 158 of the tongue 34 are aligned with the front holes 186 of the tongue pocket 176 and a removable pin (not shown) is provided extending therethrough. Also, holes 192 extending through the sidewalls 158 near the rear terminal end of tongue 34 are aligned with the rear holes 188 of the tongue pocket 176 and a bolt (not shown) is provided extending therethrough. As should now be appreciated to one skilled in the art, the removable pin can selectively be removed from the aligned holes 186, 194 thereby allowing the tongue 34 to pivot about the bolt extending through holes 188, 192 and, while tongue 34 remains generally horizontal, allow the trailer frame 12 to also pivot about the axle 16 and thereby place the trailer 10 in a tilted position at an angle from the horizontal. In the tilted position, the rear end structural member 66 is in contact with the ground whereby, for example, vehicles such as all-terrain vehicles (ATVs) and lawn tractors can be driven onto or off the trailer bed 32 and/or items on the trailer bed 32 can be dumped off therefrom. In the tilted position, the toe panel 124 and bottom side panel sections 130 of the rear end member 66 are placed generally horizontal and in contact with the ground.

Figure 18:
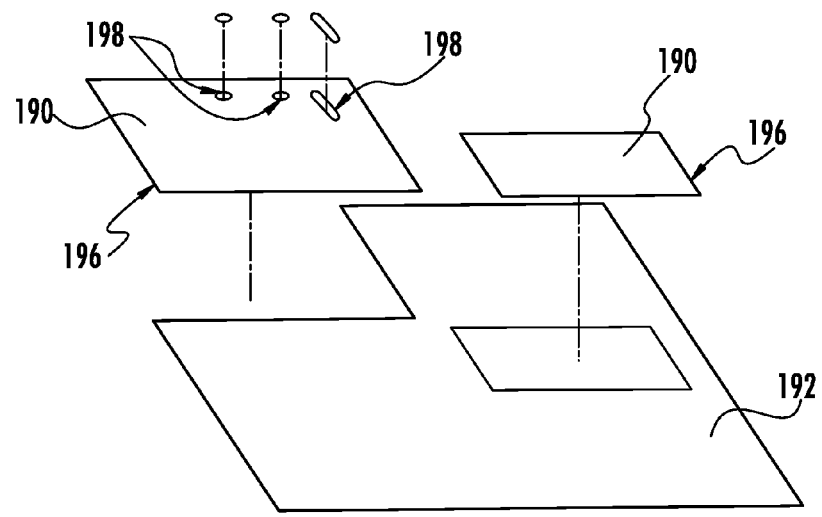
FIG. 18 is a diagrammatic view depicting the cutting of large metal sheets to desired shapes for use in forming trailer structural components/members.
Figure 19:
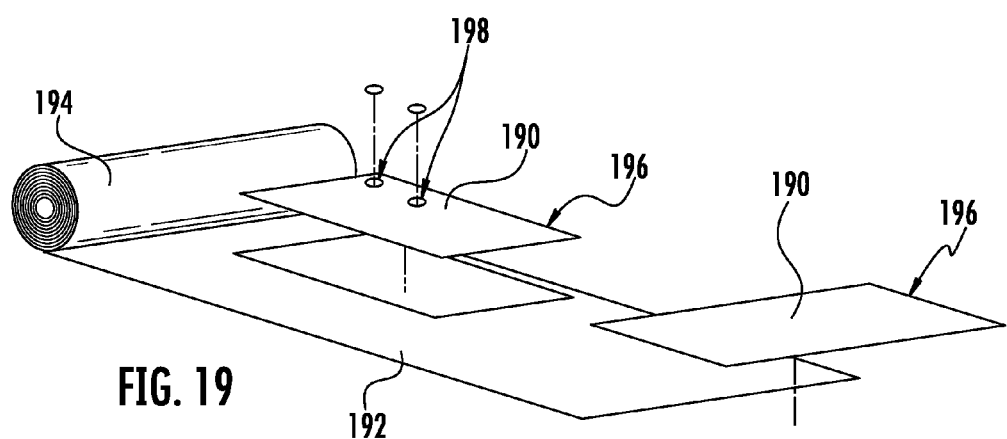
FIG. 19 is a diagrammatic view depicting the cutting of a large metal sheet provided in a roll to desired shapes for use in forming trailer structural components/members.

As mentioned hereinabove, in accordance with the principles of the present invention, the several structural components/members, including components/members 34, 42, 44, 46, 48, 50, 54, 58, 60, 62, 64, 66, 68, 70 and 176 are made of sheet metal and are then assembled for making the trailer 10. More particularly, the several structural components/members are made by cutting desired shapes which are diagrammatically indicated in FIGS. 18 and 19 with the numeral 190 from larger sheets of metal 192 and/or larger sheets of metal 192 provided on a roll. Sheet metal sheets 192 and rolls 194 are made of steel and are provided with a protective coating against rust on both sides thereof. Preferably, the protective coatings are galvanized coatings of zinc, aluminum or a combination of zinc and aluminum. The desired shapes 190, after cutting, are therefore also galvanized on both sides thereof. The sheet metal sheets 192 and rolls 194 will typically be 10 to 16 gauge in thickness and, most preferably, will be 12 to 14 gauge in thickness. Preferably, the desired shapes 190 are cut from the sheet metal sheets 192 by laser cutting, although other cutting methods such as shearing or punch pressing may be employed as well. Preferably, when cutting the desired shapes 190 from sheets 192, fastening holes and other holes and openings diagrammatically depicted by the numeral 198 are also cut or punched through the desired shapes 190. It is noted that, after cutting, the sheet metal underlying steel at the cut edges 196 is exposed and subject to rust. However, any such rusting will be quite slow and will not markedly affect the structural strength and appearance of the several components/members during the anticipated life of the trailer 10.

The desired shapes 190, as can be appreciated by one skilled in the art, have a perimeter edge 196 outline having a desired shape, e.g., width, length, etc., whereby the several components/members can be made by further bending and shaping. For example, as shown in FIG. 20, the desired shape 190 is bent as indicated "down 90°" and "up 90°" at the bend lines between the central web section 106 and the flange sections 108 for thereby forming a cross beam member 68. Also by way of example, as shown in FIG. 21, the desired shape 190 is bent as indicated for thereby forming a right side structural member 62. Also as indicated in both FIGS. 20 and 21, the several fastening holes and openings 198 that were cut or punched in the desired shapes 190 form the fastening holes and other openings whereby the several components/members can be assembled by aligning such fastening holes and openings as needed and securing the several components/members to one another with fasteners inserted therethrough. Preferably, the several components/members are assembled using rivets 200 and, more preferably, using blind rivets. It is noted that throughout the several views of the drawings the components/members, whether assembled to one another or not, for clarity purposes, are shown and depicted only with their fastening holes and openings 198 and without the fastening rivets 200.

Referring now again to FIGS. 3-12, it can be seen that the frame 12 is assembled by securing the crossbeam members 68 transversely between the left and right side structural members 60, 62. In this regard, the terminal ends 88 of crossbeam members 68 are inserted into the left and right side structural members 60, 62 placing their upper flange 108 adjacent the attachment leg 100 and their lower flange 108 adjacent the attachment leg 94. At each crossbeam terminal end 88 the upper flange 108 thereof is attached to the attachment leg 100 with one or more rivets 200 and the lower flange 108 is attached to the attachment leg 94 with one or more rivets 200 (see example thereof in FIG. 7).

The torque tube 70 is attached to the left and right side structural members 60, 62 similar to the crossbeam members 68. The torque tube terminal ends 90 are inserted into the left and right side structural members 60, 62. The terminal ends of the torque tube brim extensions 142 are thereby placed adjacent and secured to the attachment legs 100 with one or more rivets 200. Also, the terminal ends of the torque tube base section 140 are thereby placed adjacent and secured to the attachment legs 94 with one or more rivets 200 (see example thereof in FIG. 7).

Figure 12:
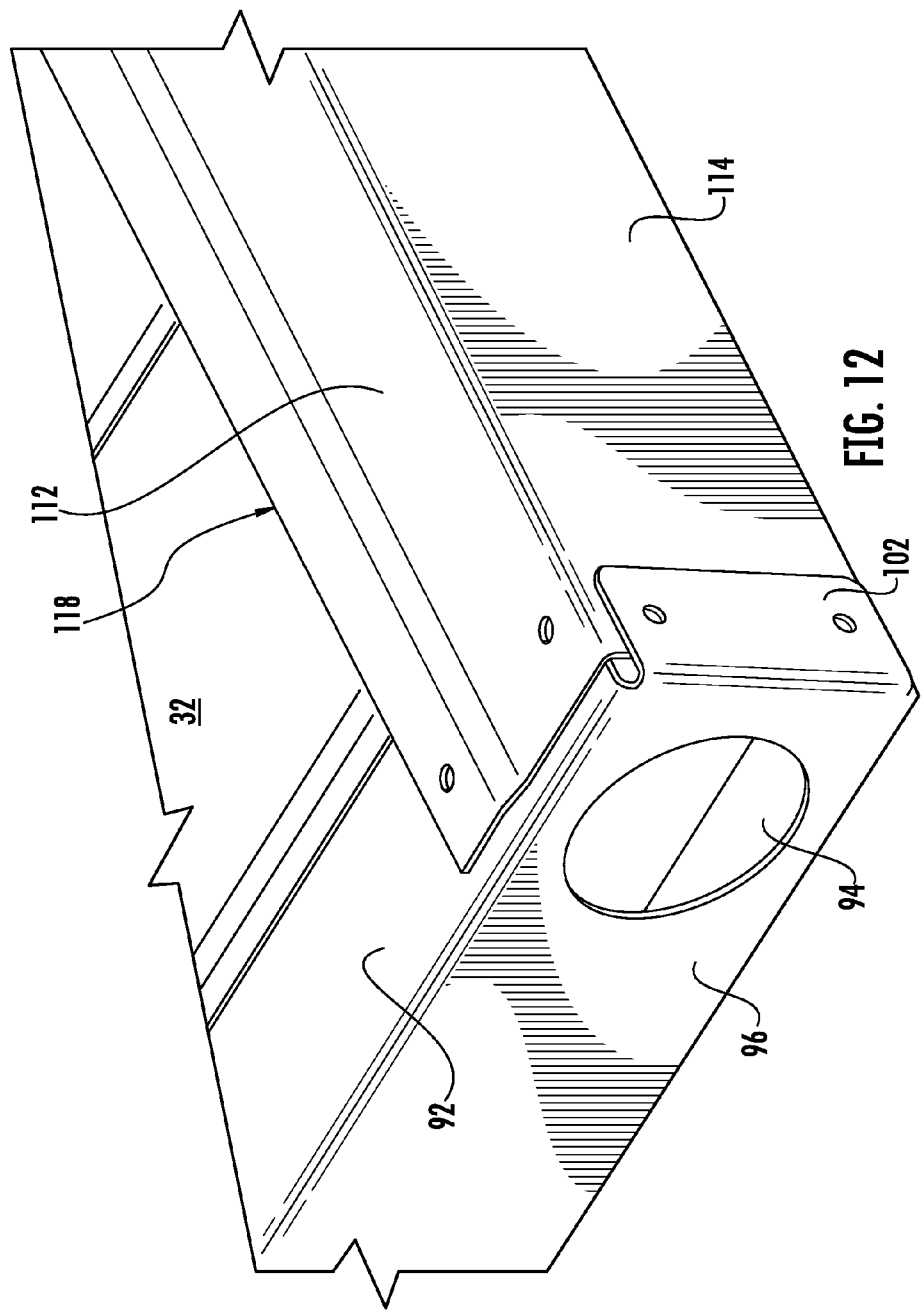
FIG. 12 is a partial perspective view of the side beam and front beam components similar to FIG. 11 but shown after assembly.

The left and right terminal ends 72, 74 of the front end structural member 64 are secured to the respective front terminal ends 76, 78 of the left and right side structural members 60, 62 as best shown in FIGS. 11 and 12. Here, the branch legs 92 are placed adjacent to and overlapping with the upper leg 112 and secured to one another with one or more rivets 200 (not shown). The tabs 102 are placed adjacent to and overlapping with the base section 114 and secured together with one or more rivets 200 (not shown). Also, the attachment legs 94 are placed adjacent to and overlapping with the lower leg 110 and secured together with one or more rivets 200 (not shown). As shown in FIG. 7 the trailer bed 32 rests on and is secured with screws (not shown) to the crossbeam members 68 and the torque tube 70. The trailer bed 32 also extends beyond the terminal edge 118 and under the interior section 116 of the front end structural member 64 thereby providing a generally smooth transition between the upper surface of the trailer bed and the upper surface of the upper leg 112 of the front end structural member 64.

The left and right terminal ends 80, 82 of the rear end structural member 66 are secured to respective rear terminal ends 84, 86 of the left and right side structural members 60, 62 as shown in FIGS. 3-6 and 10. In this regard, the bottom side panel sections 130 are placed adjacent to and overlapping with the upwardly bent elements 104 and are secured together with one or more rivets 200 (not shown). The side panels 128 are placed adjacent to and overlapping with the base section 96 and are secured together with one or more rivets 200 (not shown). Also, the upper panel 122 is placed adjacent to and overlapping with the branch leg 92 and is secured thereat with one or more rivets 200 (not shown). As best seen in FIG. 10, the trailer bed 32 extends over the crossbeam member 68 located close to the rear terminal ends 84, 86 of the left and right side members 60, 62 and under and adjacent to the upper panel 122 of the rear member 66. Screws 202 extend through and secure together the upper panel 122, the trailer bed 32 and the flange 108 of the cross beam member 68.

The tongue pocket 176 is secured to the frame 12 with its top wall 178 located adjacent to the base section 140 of the torque tube 70 and the lower leg 110 of the front end structural member 64. In this position, the tongue pocket rear tab 184 is adjacent and secured to the second leg 138 of the torque tube 70, and the tongue pocket front tab 184 is adjacent and secured to the base section 114 of the front end structural member 64.

While this invention has been described as having an exemplary design, the present invention may be further modified within the spirit and scope of this disclosure. This application is therefore intended to cover any variations, uses, or adaptations of the invention using its general principles.

What is claimed is:

1. A trailer comprising a frame supporting a trailer bed, wheels rotatably secured to the frame and a tongue adapted to be pivotally attached to a land vehicle hitch, said frame comprising:
   left and right side members and a plurality of crossbeam members attached to and extending between said side members;
   wherein said side members, viewed in cross-section, each include a U-shaped portion having a branch leg and an attachment leg integrally formed with and extending from a base section of the side member, and an L-shaped portion including a branch leg integrally formed with an attachment leg, and wherein said branch leg of said U-shaped portion is integrally formed with said branch leg of the L-shaped portion;
   wherein said attachment legs of said side members are parallel with each other and said crossbeam members; and,
   wherein terminal ends of said crossbeam members are sandwiched between and are attached to said attachment legs of said side members.

2. The trailer of claim 1 wherein said trailer bed is secured to and is supported by said crossbeam members.

3. The trailer of claim 2 wherein said crossbeam members extend transverse to said side members and said trailer bed comprises a plurality of ⅝ inch wood members extending transverse to said crossbeam members.

4. The trailer of claim 1 wherein said crossbeam members are attached to said side members with rivets.

5. The trailer of claim 1 wherein said crossbeam members are generally Z-shaped in cross-section and comprise a central web section and flange sections which are integrally formed with the central web section and extend generally perpendicular from the central web section and wherein, at each terminal end of each crossbeam member attached to said side members, one of said flange sections is secured to said U-shaped portion attachment leg and the other of said flange sections is secured to said L-shaped portion attachment leg.

6. The trailer of claim 5 wherein said crossbeam members are attached to said side members with rivets.

7. The trailer of claim 1 further comprising a torque tube extending between said side members and secured at terminal ends thereof to said U-shaped portion attachment leg and to said L-shaped portion attachment leg of said side members.

8. The trailer of claim 7 wherein said torque tube, in cross-section, comprises a first U-shaped portion nested with and secured by welding to a second U-shaped portion.

9. The trailer of claim 7 further comprising a tongue pocket secured to and extending transverse to said torque tube, said tongue pocket adapted to securely receive said tongue.

10. The trailer of claim 1 further comprising front and rear end members, wherein said end members, viewed in cross-section, each include a U-shaped portion having a lower leg and an upper leg integrally formed with and extending from a base section of the end member, and wherein terminal ends of said end members are secured to terminal ends of said left and right side members.

11. The trailer of claim 10 wherein said crossbeam members are generally Z-shaped in cross-section and comprise a central web section and flange sections which are integrally formed with the central web section and extend generally perpendicular from the central web section and wherein, at each terminal end of each crossbeam member attached to said side members, one of said flange sections is secured to said U-shaped portion attachment leg and the other of said flange sections is secured to said L-shaped portion attachment leg.

12. The trailer of claim 11 wherein said crossbeam members are attached to said side members with rivets and said end members are attached to said side members with rivets.

13. The trailer of claim 10 further comprising a torque tube extending between said side members and secured at terminal ends thereof to said U-shaped portion attachment leg and to said L-shaped portion attachment leg of said side members.

14. The trailer of claim 13 wherein said torque tube, in cross-section, comprises a first U-shaped portion nested with and secured by welding to a second U-shaped portion.

15. The trailer of claim 13 further comprising a tongue pocket secured to and extending transverse to said torque tube and said front end member, said tongue pocket adapted to securely receive said tongue.

16. The trailer of claim 10 wherein said trailer bed is secured to and is supported by said crossbeam members and extends under the upper legs of said front and rear end members.

17. The trailer of claim 16 wherein said crossbeam members are generally Z-shaped in cross-section and comprise a central web section and flange sections which are integrally formed with the central web section and extend generally perpendicular from the central web section and wherein, at each terminal end of each crossbeam member attached to said side members, one of said flange sections is secured to said U-shaped portion attachment leg and the other of said flange sections is secured to said L-shaped portion attachment leg.

18. The trailer of claim 16 further comprising a torque tube extending between said side members and secured at terminal ends thereof to said U-shaped portion attachment leg and to said L-shaped portion attachment leg of said side members.

19. The trailer of claim 16 wherein said crossbeam members extend transverse to said side members and said trailer bed comprises a plurality of 5/4 inch wood members extending transverse to said crossbeam members.

20. The trailer of claim 16 wherein a plurality of fasteners extend through said upper leg of said rear end member, said trailer bed and one of said crossbeam members.

* * * * *